Dec. 31, 1940.  A. J. HOPPER  2,227,136

RAILWAY TRUCK

Filed Dec. 14, 1938

Inventor:
Arthur J. Hopper,
by Harry E. Dunham
His Attorney.

Patented Dec. 31, 1940

2,227,136

UNITED STATES PATENT OFFICE 2,227,136

RAILWAY TRUCK

Arthur J. Hopper, Erie, Pa., assignor to General Electric Company, a corporation of New York Application December 14, 1938, Serial No. 245,702

2 Claims. (Cl. 105—113)

My invention relates to railway trucks, and especially to the type wherein a direct gear drive is used to transmit power to the driving axles of the truck from the electric motor or other source of motive power.

An object of my invention is to provide an improved and simplified construction of a railway truck, wherein the truck frame is free to move relative to the axle and the driving equipment, and the source of motive power also is free to pivot about the axis of the driving axle to which it is directly connected, when the vehicle passes over irregularities in the track.

Further objects and advantages of my invention will become apparent, and my invention will be better understood from the following description referring to the accompanying drawing, and the features of novelty which characterize my invention will be pointed out with particularity in the claims annexed to and forming part of this specification.

Figure 1:
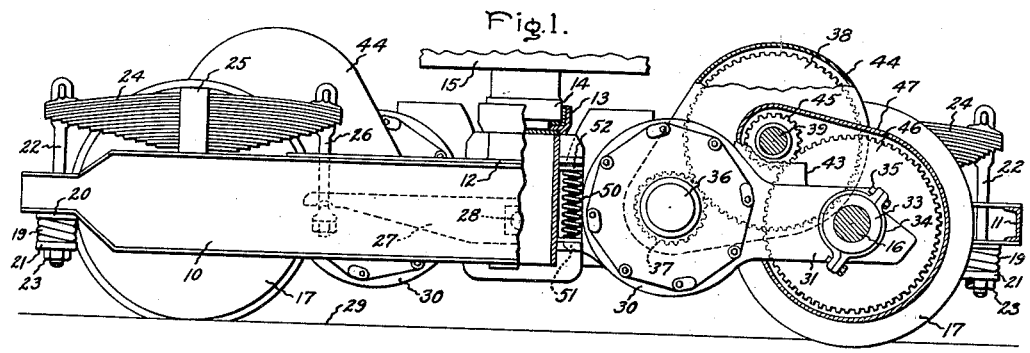
Figure 2:
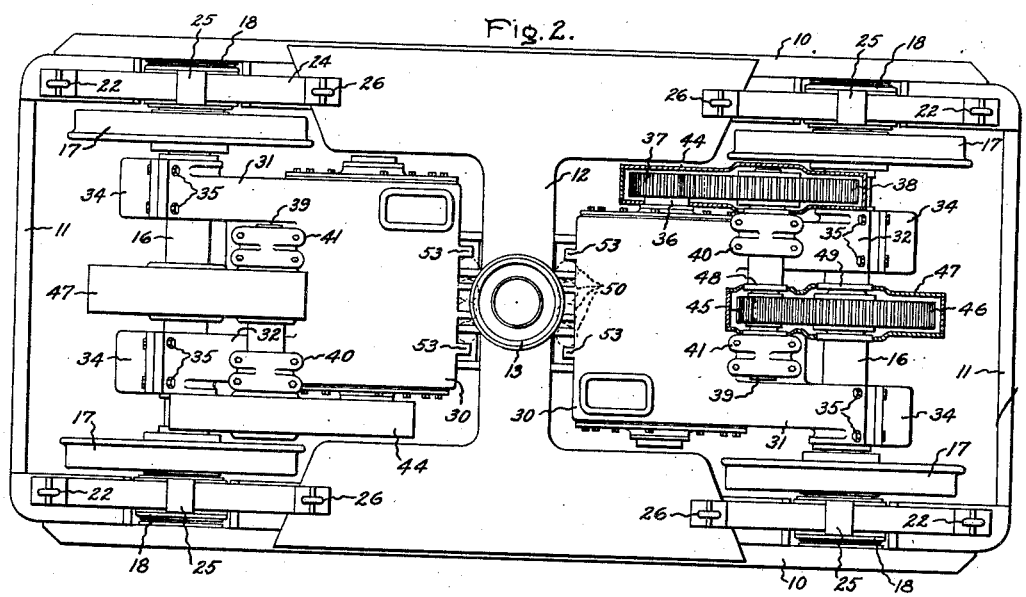
Figure 3:
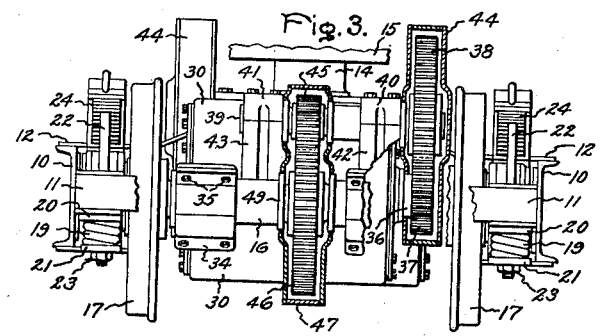

In the drawing, Fig. 1 is a side elevational view of a truck embodying my invention, partly broken away to illustrate the relative supporting features; Fig. 2 is a plan view of the truck shown in Fig. 1 having part of the gear boxes broken away to illustrate the relative arrangement of the driving gears; and Fig. 3 is an end elevational view of the truck shown in Figs. 1 and 2, also partly broken away to illustrate the arrangement of the driving gears and the supports.

Referring to the drawing, I have shown a railway truck having a substantially rectangular frame including side frames 10 connected together at their ends by transversely extending tie bars 11 and connected together at about the central portion thereof by a transversely extending bolster 12. The bolster 12 is provided with the center plate 13 arranged to support a center bearing 14 secured to a vehicle frame 15. The truck frame is resiliently supported on a pair of driving axles 16 and driving wheels 17 mounted on the axles 16 through a resilient spring suspension system supported above the journal boxes 18 at both ends of the axles 16. This spring suspension system includes a coil spring 19 arranged on the outer side of each journal box 18 which engages a spring seat 20 secured to the side frame 10 and is supported on a spring seat 21 mounted on a spring hanger 22 by a nut 23 which threadedly engages the lower end of the hanger 22. The upper end of the hanger 22 pivotally engages the outer end of a semi-elliptic leaf spring 24 which is supported in a spring strap 25 seated upon the upper surface of each of the journal boxes 18. The inner end of each of the leaf springs 24 is pivotally connected to the upper end of a spring hanger 26 which is pivotally connected at its lower end to an equalizer bar 27 extending longitudinally of the truck and pivotally secured to the side frame 10 by a pivotal support 28. In this manner, the truck frame is resiliently supported upon the driving axles 16 and is free to move with respect thereto as the wheels 17 pass over irregularities in the track 29.

The axles 16 are driven by electric motors which provide the source of motive power for propelling the vehicle. These motors are each provided with a frame 30 formed with a pair of supporting arms 31 and 32 which extend from the motor frame or casing to the axles 16 and are rigidly secured about bearings 33 on the axle 16 by bearing caps 34 bolted to the ends of the arms 31 and 32 by bolts 35. This provides a supporting arrangement for the motor frame 30 which is rigid longitudinally of the axle 16 and which may be pivoted about the axis of the axle 16. Each motor is provided with a drive shaft 36 extending transversely of the truck and parallel to the axle 16 and a spur gear 37 is rigidly secured to this drive shaft 36 and engages a gear wheel 38 of a double reduction gearing arrangement. This gear wheel 38 is mounted upon a countershaft 39 the axis of which is offset from a plane through the axis of the motor shaft 36 and the axle 16 as shown in Figs. 1 and 3, and which is rotatably supported in bearings 40 and 41 rigidly secured on supports 42 and 43 formed on the motor frame 30. A gear casing 44 is mounted on the motor frame 30 and extends about the gears 37 and 38 to provide a lubricant reservoir for these gears and to prevent foreign substances from coming in contact therewith. A second gear wheel 45 of smaller diameter than gear wheel 38 is rigidly mounted upon the shaft 39 and engages a gear wheel 46 of larger diameter than the gear wheel 45 to provide a driving connection between the shaft 39 and the axle 16 upon which the gear 46 is rigidly mounted substantially midway between the ends of the axle 16 as shown in Figs. 2 and 3. A gear casing 47 extending about the gears 45 and 46, and seals 48 and 49 extending about the shaft 39 and the axle 16, respectively, protect these gears from foreign substances. In this manner, the motor drive shaft 36 is directly coupled to the axle 16 through the double reduction gearing including the gears 37, 38, 45 and 46. Furthermore, the motor 30 and all of its associated driving equipment is mounted for pivotal movement about the axle 16, and also is mounted rigidly longitudinally of the axle. In order to provide for the free relative movement between the truck frame and the axle 16 without the transmission of undesirable forces between the truck frame and the motor frame 30, a plurality of coil springs 50 is supported upon brackets 51 secured to the truck bolster 12 for resiliently mounting the motor thereon. The upper ends of these springs 50 engage a supporting plate 52 which supports lugs 53 formed on the motor frame 30. Thus, the inner end of the motor frame 30 is resiliently supported for free relative movement with respect to the truck frame and for relative movement between the driving equipment and the axle without the transmission of harmful forces therebetween.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A railway vehicle truck having a frame, a driving axle, wheels on said axle, resilient means for supporting said truck frame on said axle, a motive power source having a drive shaft, a frame for said motive power source having arms formed thereon, means for supporting said motive power source on said truck frame, means including said arms for supporting said motive power source pivotally on said axle, a gear mounted on said drive shaft adjacent one of said wheels, said motive power source being constructed to extend longitudinally substantially from said drive shaft gear to the wheel opposite thereto to provide as large a motive power source as practical, and means including reduction gearing rigidly supported on said motive power source frame with the axis thereof offset from a plane through the axis of said drive shaft and said axle for providing a driving connection between said drive shaft gear and said driving axle without requiring a reduction in length and diameter of said motive power source to accommodate said reduction gearing, said reduction gearing including a gear connected to said axle intermediate said frame arms.

2. A railway vehicle truck having a frame, a driving axle, wheels on said axle, a motive power source having a drive shaft and a frame, means for supporting said motive power source frame on said truck frame, other means including arms extending from said motive power source frame for supporting pivotally said last-mentioned frame on said axle, a gear secured to said axle substantially midway between the ends thereof, a gear mounted on said drive shaft adjacent one of said wheels, said motive power source being constructed to extend longitudinally substantially from said drive shaft gear to the wheel opposite thereto to provide as large a motive power source as practical, and means including reduction gearing rigidly carried by said motive power source frame having a shaft with the axis thereof offset from a plane through the axis of said drive shaft and said axle for providing a driving connection between said drive shaft gear and said axle gear without requiring a reduction in length or diameter of said motive power source to accommodate said reduction gearing.

ARTHUR J. HOPPER.